US011062563B2

(12) United States Patent
Shepherd et al.

(10) Patent No.: US 11,062,563 B2
(45) Date of Patent: Jul. 13, 2021

(54) SYSTEM AND METHOD FOR INCENTIVIZING PURCHASES IN ASSOCIATION WITH A GAMING ESTABLISHMENT RETAIL ACCOUNT

(71) Applicant: IGT, Las Vegas, NV (US)

(72) Inventors: Jeffery Shepherd, Reno, NV (US); Kevin Higgins, Reno, NV (US)

(73) Assignee: IGT, Las Vegas, NV (US)

( * ) Notice: Subject to any disclaimer, the term of this patent is extended or adjusted under 35 U.S.C. 154(b) by 0 days.

(21) Appl. No.: 16/591,188

(22) Filed: Oct. 2, 2019

(65) Prior Publication Data

US 2021/0104123 A1 Apr. 8, 2021

(51) Int. Cl.
*G06F 17/00* (2019.01)
*G07F 17/32* (2006.01)

(52) U.S. Cl.
CPC ................................ *G07F 17/3255* (2013.01)

(58) Field of Classification Search
None
See application file for complete search history.

(56) References Cited

U.S. PATENT DOCUMENTS 7,112,138 B2 9/2006 Hedrick et al.
7,416,485 B2 8/2008 Walker et al.
7,993,197 B2 8/2011 Kaminkow
8,202,156 B2 6/2012 Bartholomew
8,412,604 B1 4/2013 Graham et al.
8,632,397 B2 1/2014 Sommer et al.
8,777,725 B2 7/2014 Sanford et al.
8,821,262 B2 9/2014 Smith et al.
9,129,298 B2 9/2015 Soukup et al.
9,615,213 B2 4/2017 Tibbitts et al.
9,672,686 B2 6/2017 Nguyen
9,785,926 B2 * 10/2017 Sanford ............. G06Q 20/1085
10,360,763 B2 7/2019 Higgins et al.
2002/0151359 A1 10/2002 Rowe
2003/0228901 A1 * 12/2003 Walker ................ G07F 17/3244 463/25
2004/0235551 A1 * 11/2004 Walker .................... G07F 17/32 463/16
2006/0208065 A1 * 9/2006 Mendelovich ......... G06Q 30/02 235/380
2006/0281539 A1 12/2006 Wilhite et al.
2008/0028187 A1 1/2008 Casselman et al.
2009/0088245 A1 4/2009 Klinkhammer et al.
2010/0029376 A1 2/2010 Hardy et al.
2011/0307318 A1 12/2011 LaPorte et al.
2014/0278891 A1 9/2014 Heaven et al.
2015/0066273 A1 3/2015 Debert et al.
2015/0243133 A1 8/2015 Nicholas
2017/0083897 A1 * 3/2017 Sezgin ............... G06Q 30/0222
2017/0092054 A1 3/2017 Petersen et al.
2018/0374304 A1 12/2018 Sanford et al.
2019/0188963 A1 6/2019 Higgins et al.

* cited by examiner

*Primary Examiner* — Paul A D'Agostino
(74) *Attorney, Agent, or Firm* — Neal, Gerber & Eisenberg LLP

(57) ABSTRACT

A system and method that provides zero, one or more incentives to a retail patron in association with utilizing an amount of funds in one or more gaming establishment accounts to complete one or more purchases of goods and/or services from a retail establishment.

18 Claims, 5 Drawing Sheets

SYSTEM AND METHOD FOR INCENTIVIZING PURCHASES IN ASSOCIATION WITH A GAMING ESTABLISHMENT RETAIL ACCOUNT

TECHNICAL FIELD

The technical field of the present disclosure is that of systems and methods that provides zero, one or more incentives to a retail patron in association with utilizing an amount of funds in one or more gaming establishment accounts to complete one or more purchases of goods and/or services from a retail establishment.

BACKGROUND

Certain casinos may offer patrons the opportunity to earn player tracking points for retail purchases made in the casino. In these casinos, the patron may swipe their player tracking card at a point-of-sale terminal when making a retail purchases. The point-of-sale terminal may then interact with the casino's player tracking system which may record the retail purchase and reward an amount of player tracking points based on the purchase price of the retail purchase.

BRIEF SUMMARY

In certain embodiments, the present disclosure relates to a system including a processor, and a memory device that stores a plurality of instructions. When executed by the processor responsive to a receipt of data associated with a completion of a retail purchase, the instructions cause the processor to receive data associated with a determined source of funds used to complete the retail purchase. When executed by the processor responsive to the determined source of funds used to complete the retail purchase being a designated source of funds, the instructions cause the processor to determine a first incentive, and associate the determined first incentive with a retail patron.

In certain embodiments, the present disclosure relates to a system including a processor, and a memory device that stores a plurality of instructions. When executed by the processor responsive to an approved purchase at a point-of-sale terminal associated with a retail establishment, the instructions cause the processor to cause a transfer of an amount of funds from a gaming establishment retail account maintained in association with a retail patron to an account associated with the retail establishment, and communicate data associated with the transfer to a component of a gaming establishment patron management system. In these embodiments, the communication of data associated with the transfer occurs independent of the point-of-sale terminal associated with the retail establishment and the component of the gaming establishment patron management system determines an incentive to associate with the retail patron in association with the approved purchase at the point-of-sale terminal associated with the retail establishment.

In certain embodiments, the present disclosure relates to a method of operating a system including, responsive to a receipt of data associated with a completion of a retail purchase, receiving data associated with a determined source of funds used to complete the retail purchase. Responsive to the determined source of funds used to complete the retail purchase being a designated source of funds, the method includes determining, by a processor, a first incentive, and associating, by the processor, the determined first incentive with a retail patron.

Additional features are described herein, and will be apparent from the following Detailed Description and the figures.

DETAILED DESCRIPTION

Figure 1:
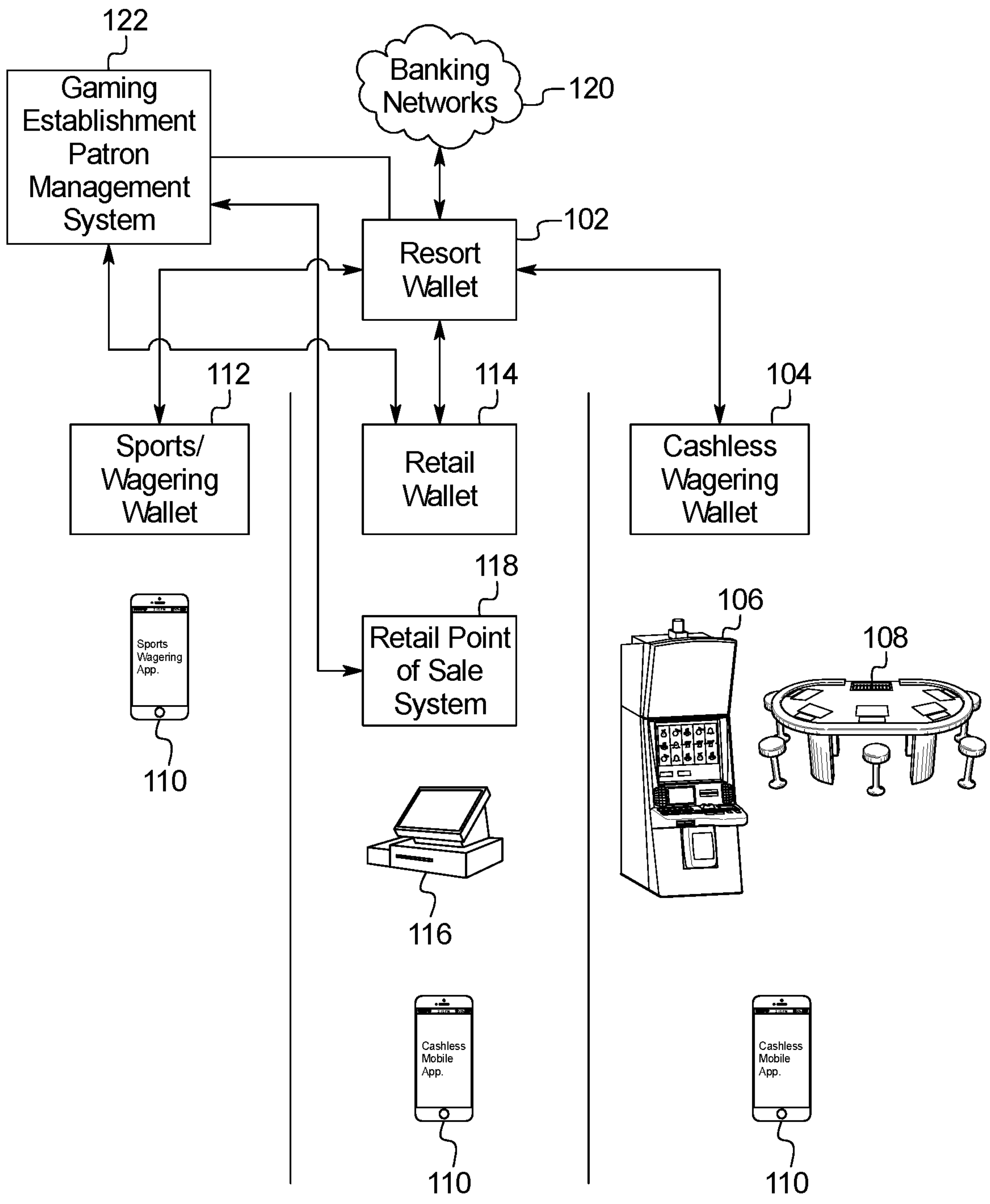
FIG. 1 is an example configuration of the architecture of a plurality of different components of the system disclosed herein.

In various embodiments, the system and method disclosed herein provides zero, one or more incentives to a retail patron in association with utilizing an amount of funds in one or more gaming establishment accounts to complete one or more purchases of goods and/or services from a retail establishment, such as a gaming establishment retail establishment.

In certain embodiments, to incentivize a retail patron to use an amount of funds in a gaming establishment account to complete a retail purchase with a retail establishment, the system provides one or more benefits and/or one or more opportunities to obtain one or more benefits not otherwise available to the retail patron. That is, to prioritize using funds in a gaming establishment account to make one or more retail purchases over using other funds to make one or more retail purchases, the system disclosed herein offers retail patrons an additional incentive for using funds in a gaming establishment account to make one or more retail purchases. In addition to benefiting both retail patrons and retailers via the reduction of credit card processing fees associated with certain retail purchase transactions and in view of the various security concerns (e.g., protecting gaming establishment patrons carrying cash to retail establishments) associated with cash-based retail transactions, the system disclosed herein encourages retail patrons to participate in an alternative, non-cash-based option for the retail patron to purchase goods and/or services from a retail establishment, thereby expanding the cashless ecosystem certain gaming establishments strive for.

In certain embodiments, upon a completion of a retail purchase associated with an identified retail patron, the system determines whether the funds used to complete the retail purchase were transferred to the retail establishment from a designated gaming establishment account, such as a gaming establishment retail account. Put differently, following a retail purchase, such as a purchase of goods and/or services from a point-of-sale terminal at a retail establishment, the system determines whether the source of funds used to complete the retail purchase were from a designated source of funds.

If the system determines that the funds used to complete the retail purchase were transferred to the retail establishment from a designated source of funds, such as a gaming establishment account, the system provides an additional incentive to the retail patron in association with the completed retail purchase. In other words, in addition to any base incentive provided to all identified retail patrons that complete retail purchases at that retail establishment, the system provides an identified retail patron whom has used funds from a designated source of funds to complete a retail purchase a bonus incentive. For example, if the system determines that to procure goods from a retail establishment associated with a gaming establishment, a retail patron transferred an amount of funds from a gaming establishment retail account associated with the retail patron to an account associated with the retail establishment, in addition to providing the retail patron a base amount of player tracking points associated with the gaming establishment, the system also provides the retail patron a bonus amount of player tracking points associated with the gaming establishment. This bonus amount of player tracking points operates as an incentive for the retail patron (and other retail patrons) to continue to use funds from a designated source of funds to complete retail purchases.

In one embodiment, upon determining that the funds used to complete the retail purchase were transferred to the retail establishment from a designated gaming establishment account, the point-of-sale terminal at the retail establishment informs the gaming establishment patron management system, such as a player tracking system, that a completed retail purchase included funds transferred from a designated gaming establishment account. In this embodiment, the gaming establishment patron management system proceeds to determine the base incentive (e.g., the incentive available to any identified retail patrons whom present a gaming establishment player tracking card when completing a retail purchase at a retail establishment associated with the gaming establishment) as well as the bonus incentive (e.g., the additional incentive available to identified retail patrons whom use funds from a designated source of funds to complete a retail purchase).

In another embodiment, upon determining that the funds used to complete the retail purchase were transferred to the retail establishment from a designated gaming establishment account, the point-of-sale terminal at the retail establishment informs the gaming establishment patron management system, that a completed retail purchase was made. In this embodiment, in addition to the communication from the point-of-sale terminal to the gaming establishment patron management system, a gaming establishment fund management system independently informs the gaming establishment patron management system that the completed retail purchase included funds transferred from a designated gaming establishment account. Upon receiving data from both the retail point-of-sale system and the gaming establishment fund management system, the gaming establishment patron management system proceeds to determine the base incentive from the data communicated from the point-of-sale terminal as well as the bonus incentive from the data communicated from the gaming establishment fund management system. It should be appreciated that since the data regarding the bonus incentive earned from the completed retail purchase of this embodiment is derived from the gaming establishment fund management system, this embodiment provides that existing protocols for earning an incentive in association with a retail purchase at a point-of-sale terminal may be used to determine the base incentive.

In another embodiment, upon determining that the funds used to complete the retail purchase were transferred to the retail establishment from a designated gaming establishment account, the gaming establishment fund management system informs the gaming establishment patron management system that a completed retail purchase included funds transferred from a designated gaming establishment account. In this embodiment, the gaming establishment patron management system proceeds to determine both the base incentive and the bonus incentive from this data communicated from the gaming establishment fund management system. It should be appreciated that in addition to utilizing the gaming establishment fund management system (and not any components of a retail point-of-sale system) to determine any incentives for the completed retail purchase, since the gaming establishment fund management system maintains an identity of the retail patron whom made the retail purchase, the retail patron of this embodiment does not need to present any gaming establishment patron management system identification, such as a player tracking card, when making the retail purchase at the point-of-sale terminal.

On the other hand, if the system determines that the funds used to complete the retail purchase were not transferred to the retail establishment from a designated source of funds, such as a gaming establishment account, the system provides no additional incentive to the retail patron in association with the completed retail purchase. For example, if the system determines that a retail patron paid an amount of cash to procure goods from a retail establishment associated with a gaming establishment, while the system may still provide the retail patron a base amount of player tracking points associated with the gaming establishment (i.e., the base incentive), the system does not provide the retail patron any bonus amounts of player tracking points associated with the gaming establishment.

Accordingly, to incentivize the use of an amount of funds in a gaming establishment account to complete a retail purchase with a retail establishment, the system disclosed herein provides one or more incentives not otherwise available to the retail patron. Such a configuration of prioritizing the use of funds from a first funding source over a second funding source encourages retail patrons to select the first funding source which provides benefits to both the retail patron (e.g., additional compensation in the form of additional rewards) and the gaming establishment (e.g., minimizes the use of cash in a gaming establishment (which creates a safer gaming establishment environment while reducing costs in processing and handling cash) and minimizes certain credit card processing fees paid in association with a retail purchase transaction, such as credit card processing fees paid by a gaming establishment or a third-party that operates a retail establishment).

System Accounts

In various embodiments, the system disclosed herein includes various components or sub-systems that are each associated with or otherwise maintain one or more electronic or virtual accounts. In these embodiments, the various accounts maintained for a user collectively form a resort or enterprise account (e.g., a gaming establishment fund management account) for the user. That is, the collection of cashless wagering accounts (e.g. cashless gaming establishment wagering wallets, cashless sports wagering wallets and/or cashless mobile wagering wallets) and gaming establishment retail accounts (e.g., gaming establishment retail wallets) associated with or otherwise maintained for a user, such as a retail patron and/or a player of a gaming establishment wagering device, collectively form a resort or enterprise account (i.e., an integrated resort or gaming establishment fund management wallet) that the user may access to transfer funds and/or view balance information amongst the various accounts associated with or otherwise maintained for the user. As such, the system includes one or more gaming establishment fund management systems that are each associated with or otherwise maintain one or more gaming establishment fund management accounts for a user.

In various embodiments, the gaming establishment fund management system includes one or more cashless wagering systems that are each associated with or otherwise maintain one or more cashless wagering accounts. In certain embodiments, the gaming establishment fund management system includes a first cashless wagering system that maintains a first cashless wagering account. In these embodiments, a user, such as a player of a gaming establishment wagering device, utilizes a mobile device application running on a mobile device to facilitate the electronic transfer of any funds between this first cashless wagering account and a gaming establishment wagering device that offers wagering games, such as an electronic gaming machine ("EGM") including, but not limited to, a slot machine, a video poker machine, a video lottery terminal, a terminal associated with an electronic table game, a terminal associated with a live table game, a video keno machine, a video bingo machine located on a casino floor and/or a sports betting terminal (that offers wagering games and sports betting opportunities). For example, as seen in FIG. 1, the gaming establishment fund management system includes a first cashless wagering system (not shown) that maintains a Cashless Wagering Wallet 104 (e.g., a first cashless wagering account) which is in communication with the resort wallet 102. In this example, to facilitate the transfer of funds from this cashless wagering account to a credit balance of an EGM 106 and/or a gaming table 108, the system utilizes a mobile device 110 running a mobile device application that interfaces with one or more components of the gaming establishment fund management system to enable a user, such as a player of the EGM or a player at the gaming table, access to this first cashless wagering account.

In certain embodiments, the gaming establishment fund management system additionally or alternatively includes a second cashless wagering system that maintains a second cashless wagering account. In these embodiments, funds associated with the second cashless wagering account are utilized to place one or more sporting event wagers and/or wagers placed remote from an EGM and a gaming table. In such embodiments, a user utilizes a mobile device application running on a mobile device to facilitate the electronic transfer of any funds between this second cashless wagering account and a credit balance accessible to wager on games of chance, games of skill and/or sporting events remote from an EGM and a gaming table. For example, as seen in FIG. 1, the gaming establishment fund management system includes a second cashless wagering system (not shown) that maintains a Sports/Mobile Wagering Wallet 112 (e.g., a second cashless wagering account) which is in communication with the resort wallet 102. In this example, to facilitate the transfer of funds from this cashless wagering account to a credit balance associated with a sporting event wagering system (not shown) and/or a remote wagering system (not shown) to enable the placement of one or more wagers on one or more games of chance, one or more games of skill and/or one or more sporting events, the system utilizes a mobile device 110 running a mobile device application that interfaces with one or more components of the gaming establishment fund management system to enable a user, such as a player remote from the gaming establishment, access to this second cashless wagering account.

In various embodiments, in addition to or an alternative of maintaining one or more cashless wagering accounts via one or more cashless wagering systems, the gaming establishment fund management system includes one or more gaming establishment retail wallet systems that each maintain one or more gaming establishment retail accounts. Such a gaming establishment retail account (e.g., a gaming establishment retail wallet) of a gaming establishment retail wallet system integrates with various retail point-of-sale systems throughout the gaming establishment (or located remote from the gaming establishment, but otherwise associated with the gaming establishment) to enable users to purchase goods and/or services via the user's gaming establishment retail account. Continuing with this example, as seen in FIG. 1, the gaming establishment fund management system includes a gaming establishment retail wallet system (not shown) that maintains a Retail Wallet 114 (e.g., a gaming establishment retail account) which is in communication with the resort wallet 102. In this example, to facilitate the transfer of funds from this gaming establishment retail account to an account associated with a retailer to purchase goods and/or services from the retailer, the system utilizes a mobile device 110 running a mobile device application that interfaces with a point-of-sale terminal 116 of a retail point-of-sale system 118 of the retailer and one or more components of the gaming establishment fund management system to enable a user access to this gaming establishment retail account. It should be appreciated that in various embodiments, a gaming establishment retail account is a retail account associated with a user having a balance or a pre-paid access account which, per current regulations from the U.S. Treasury Department Financial Crimes Enforcement Network ("FinCEN"), cannot be convertible to cash and can only be used for the purchase of goods and/or services. In these embodiments, such a gaming establishment retail account integrates with various retail point-of-sale systems of various retail establishments throughout or otherwise associated with a gaming establishment to enable users to purchase goods and/or services via the user's gaming establishment retail account. That is, while an amount of funds deposited in a gaming establishment retail account may be used with various retail point-of-sale systems throughout the gaming establishment (or remote from, but otherwise associated with the gaming establishment) to enable users to purchase goods and/or services, such funds deposited in the gaming establishment retail account cannot be converted to cash.

In certain embodiments, the system utilizes one mobile device application to interact with the different components of the gaming establishment fund management system to access funds maintained in the different gaming establishment accounts associated with the user. For example, as seen in FIG. 1, utilizing the same cardless mobile application, the mobile device 110 interacts with both the first cashless wagering system of the gaming establishment fund management system and the gaming establishment retail wallet system of the gaming establishment fund management system. In certain embodiments, the system utilizes multiple mobile device applications to interact with the different components of the gaming establishment fund management system to access funds maintained in the different gaming establishment accounts associated with the user. For example, as seen in FIG. 1, in addition to utilizing a cardless mobile application to interact with different systems of the gaming establishment fund management system, utilizing a sports/mobile wagering mobile application, the mobile device 110 interacts with the second cashless wagering system of the gaming establishment fund management system. In certain of these embodiments, the mobile device application includes a location based digital wallet enabled application, such as a Passbook-enabled or Wallet-enabled application, which is accessible when the player enters a gaming establishment. In certain of such embodiments, the mobile device application is downloaded to the mobile device from an application store. In certain of such embodiments, the mobile device application is downloaded to the mobile device from one or more websites affiliated with the gaming establishment (which are accessible directly by the user and/or by a link opened when the user scans a QR code).

It should be appreciated that while illustrated as using a mobile device running a mobile device application to access funds associated with different gaming establishment accounts, such as a cashless wagering account and a gaming establishment retail account, a physical instrument, such as a user issued magnetic striped card may additionally or alternatively be utilized to enable a user access to such gaming establishment accounts. It should be further appreciated that in different embodiments, in addition to or alternatively from utilizing a mobile device running a mobile device application to access funds associated with different gaming establishment accounts, the system utilizes a kiosk, an EGM, a remote host controller service window displayed by an EGM, a component of a gaming establishment patron management system, such as a player tracking unit, and/or a gaming establishment interface to access the funds associated with such gaming establishment accounts.

In certain embodiments, the gaming establishment fund management system is in communication with one or more external funding sources which maintain one or more external accounts for the user. For example, as seen in FIG. 1, the gaming establishment fund management system that maintains the resort wallet 102 is in communication with a network of one or more banks or other financial institutions (i.e., the banking networks 120) which, as described below, operate to electronically transfer funds from the user's accounts maintained as such banks or financial institutions to one or more of the accounts maintained by the gaming establishment fund management system. In certain embodiments, such external accounts include, but are not limited to, one or more credit card accounts maintained by one or more financial institutions, one or more debit card accounts maintained by one or more banks or credit unions, one or more financial institution accounts, such as a brokerage account, maintained by one or more financial institutions and/or one or more third-party maintained accounts (e.g., one or more PayPal® accounts or Venmo® accounts). It should be appreciated that while illustrated as the gaming establishment fund management system being in communication with one or more external funding sources, in different embodiments, any component or sub-system described herein can be in communication with one or more external funding sources. In different embodiments, the system utilizes a mobile device running a mobile device application, a kiosk, an EGM, a remote host controller service window displayed by an EGM, a component of a gaming establishment patron management system, such as a player tracking unit, and/or a gaming establishment interface to facilitate the transfer of funds from a third-party account.

In certain embodiments, one or more components of the gaming establishment fund management system are in communication with one or more components of a gaming establishment patron management system which determine whether or not to offer a user a benefit (and/or opportunity to obtain a benefit) in association with making one or more retail purchases with funds transferred from a designated source of funds. For example, as seen in FIG. 1, the gaming establishment fund management system that maintains the resort wallet 102, the gaming establishment retail wallet system component of the gaming establishment fund management system that maintains the Retail Wallet 114 and the Retail Point-of-Sale System 118 are each in communication with a gaming establishment patron management system 122, such as a player tracking system, which includes one or more servers that operate to determine one or more benefits (or opportunities to obtain one or more benefits) to incentivize a user to use one source of funds to make retail purchases over another source of funds.

In certain embodiments (not shown), the gaming establishment fund management system (which maintains a gaming establishment fund management account or resort wallet for a user) is in communication with one or more credit systems that each issue the user one or more lines of credit or markers and/or one or more credit reporting/credit risk systems that monitor and report on various accounts associated with the user. It should be appreciated that while described as the gaming establishment fund management system being in communication with one or more credit systems and/or one or more credit reporting/credit risk systems, in different embodiments, any component or subsystem described herein can be in communication with one or more credit systems and/or one or more credit reporting/credit risk systems.

Funding Gaming Establishment Retail Account

In various embodiments, prior to utilizing funds maintained in a gaming establishment retail account to purchase goods and/or services from a retail establishment as described herein, an amount of funds must first be established or otherwise deposited in a gaming establishment retail account.

In certain embodiments, the system enables a user, such as a retail patron and/or player of a gaming establishment device, to enroll or otherwise sign up for a gaming establishment retail account via a user picking up a retail account card at various locations, such as shops, throughout the gaming establishment. In certain embodiments, the system enables a user to electronically enroll or otherwise sign up for a gaming establishment retail account via a mobile application running on a mobile device, a point-of-sale terminal, an EGM and/or a kiosk. In certain embodiments, the system enables a user to enroll or otherwise sign up for a gaming establishment retail account by adding a retail account to their existing player tracking account.

In certain embodiments, a gaming establishment retail account is associated with a third-party account, such as one or more credit card accounts, one or more debit card accounts and/or one or more third-party maintained accounts (e.g., one or more PayPal® accounts or Venmo® accounts), from which funds are drawn from to fund the gaming establishment retail account. In certain embodiments, the gaming establishment retail account is associated with a gaming establishment or a group of gaming establishments, wherein the system enables the user to establish a gaming establishment retail account by a deposit of funds (such as at a kiosk). In other embodiments, the system funds the gaming establishment retail account via a mobile device electronic fund transfer, such using Apple Pay™ or Android Pay™. In various embodiments, the system utilizes a mobile device running a mobile device application, a kiosk, an EGM and/or a gaming establishment interface to facilitate this transfer of funds from a third-party account.

In certain embodiments, the system enables funds to be deposited in a gaming establishment retail account via an EGM. In certain embodiments, the system enables a user that has an amount of cash to utilize an EGM to convert the cash to an amount deposited into a gaming establishment retail account (which is subsequently utilized to purchase goods and/or services at the gaming establishment and/or transferred to a cashless wagering account as non-cashable credits for a subsequent transfer to an EGM utilizing a mobile device application). In other embodiments, the system enables funds to be deposited in a gaming establishment retail account via an EGM that accepts ticket vouchers (i.e., a bearer instrument redeemable for cash or game play on the EGM). In these embodiments, a ticket voucher may be in paper form (in which case the paper ticket voucher is received and read by the EGM) or in virtual form (in which case data associated with the virtual ticket voucher communicated to the EGM from a device, such as a mobile device, with access to the virtual ticket voucher). In such embodiments, the system enables a user that has one or more ticket vouchers to utilize an EGM to convert the ticket voucher to an amount deposited into a gaming establishment retail account (which is subsequently utilized to purchase goods and/or services at the gaming establishment and/or transferred to a cashless wagering account as non-cashable credits for a subsequent transfer to an EGM utilizing a mobile device application).

In certain embodiments, the system enables funds to be deposited in a gaming establishment retail account via a gaming establishment interface, such as a casino desk. In certain embodiments, the system enables a user that has an amount of cash to utilize a gaming establishment interface, such as a casino desk to convert the cash to an amount deposited into a gaming establishment retail account (which is subsequently utilized to purchase goods and/or services at the gaming establishment and/or transferred to a cashless wagering account as non-cashable credits for a subsequent transfer to an EGM utilizing a mobile device application). In other embodiments, the system enables funds to be deposited in a gaming establishment retail account via a gaming establishment interface that accepts ticket vouchers, in paper or virtual form. In these embodiments, the system enables a user that has one or more printed ticket vouchers to utilize a gaming establishment interface to convert the ticket voucher to an amount deposited into a gaming establishment retail account (which is subsequently utilized to purchase goods and/or services at the gaming establishment and/or transferred to a cashless wagering account as non-cashable credits for a subsequent transfer to an EGM utilizing a mobile device application).

In certain embodiments, the system enables funds to be deposited in a gaming establishment retail account via a kiosk that accepts money. In certain embodiments, the system enables a user that has an amount of cash to utilize a kiosk to convert the cash to an amount deposited into a gaming establishment retail account (which is subsequently utilized to purchase goods and/or services at the gaming establishment and/or transferred to a cashless wagering account as non-cashable credits for a subsequent transfer to an EGM utilizing a mobile device application). In other embodiments, the system enables funds to be deposited in a gaming establishment retail account via a kiosk that accepts ticket vouchers, in paper or virtual form. In these embodiments, the system enables a user that has one or more ticket vouchers to utilize a kiosk to convert the printed ticket voucher to an amount deposited into a gaming establishment retail account (which is subsequently utilized to purchase goods and/or services at the gaming establishment and/or transferred to a cashless wagering account as non-cashable credits for a subsequent transfer to an EGM utilizing a mobile device application).

In certain embodiments, the system enables a user to fund the gaming establishment retail account independent of the mobile device and independent of the mobile device application. In certain other embodiments, the system enables a user to utilize a mobile device running a mobile device application to fund the gaming establishment retail account. More specifically and utilizing the example of a kiosk, in one embodiment, to utilize a mobile device and a kiosk to facilitate the funding of a gaming establishment retail account, the user wirelessly pairs or otherwise connects a mobile device with a kiosk. In one example embodiment, the user moves the mobile device into the range of a wireless receiver of the kiosk. The kiosk and the launched or activated mobile device application of the mobile device negotiate a secure, authenticated connection with the proper functionality, versions and security settings.

After connecting the mobile device to the kiosk, the kiosk prompts the user to deposit an amount of funds into the kiosk. In one such embodiment, the kiosk prompts the user to insert one or more bills into a bill acceptor of the kiosk. In another such embodiment, the kiosk additionally or alternatively prompts the user to deposit a ticket voucher (in paper or virtual form and associated with an amount of funds) into the kiosk. In another such embodiment, the kiosk additionally or alternatively prompts the user to deposit a card associated with an external account, such as a credit card or debit card into the kiosk. In another such embodiment, the kiosk additionally or alternatively prompts the user to enter information associated with an external account, such as a credit card account, a PayPal® account, a Venmo® account, or a debit card account into the kiosk. In another such embodiment, the kiosk additionally or alternatively prompts the user to deposit an amount of funds into the kiosk using a mobile device electronic fund transfer, such using Apple Pay™ or Android Pay™.

In one embodiment, after a first amount of funds is accepted, such as after a first bill or unit of currency is accepted, by the kiosk, the kiosk and/or the mobile device application enable the user to transfer the deposited amount of funds (e.g., a “Load Phone Now” button) or continue to deposit additional amounts of funds with the kiosk. In certain embodiments, upon receiving an amount of funds from the user and the user indicating to transfer the deposited amount of funds in association with the mobile device application, the kiosk communicates with one or more servers, such as a gaming establishment retail server, to transfer an amount of money to a gaming establishment retail account (to be subsequently utilized to purchase goods and/or services at the gaming establishment and/or transferred to a cashless wagering account as non-cashable credits for a subsequent transfer to an EGM utilizing a mobile device application).

It should be appreciated that while the above example embodiments are described in relation to utilizing a mobile device to facilitate the transferring one or more amounts of money or units of currency from a kiosk to a gaming establishment retail account, such example embodiments may also be used to transfer, either as an isolated transaction or as part of an operation mode of the EGM, one or more amounts of money or units of currency from an EGM to a gaming establishment retail account and/or from a gaming establishment interface, such as a casino desk, to a gaming establishment retail account.

In certain embodiments, the system utilizes a mobile device to facilitate the transfer of funds from a cashless wagering account maintained for the user (or another gaming establishment account maintained for the user) to a gaming establishment retail account. In certain of these embodiments, the transfer of funds from the cashless wagering account to the gaming establishment retail account occurs via one or more applications being run or executed on the mobile device. It should be appreciated that in various embodiments the system limits the transfer of funds from a cashless wagering account to a gaming establishment retail account to funds that can be redeemed for cash, such as cashable credits and/or non-restricted promotional credits. That is, to prevent a user from improperly converting non-cashable credits held in a cashless wagering account to products and/or services, the system enables the user to utilize cashable credits (i.e., credits that can be directly converted to cash) to load funds from their cashless wagering account to their gaming establishment retail account (which are then usable for goods and/or services, but not otherwise redeemable for cash). In certain embodiments, this configuration provides just-in-time funding of the gaming establishment retail account to enable the user to make purchases at different point-of-sale locations associated with the gaming establishment retail network.

Following the user's decision to transfer an amount of funds (in the form of cashable credits) from a cashless wagering account to a gaming establishment retail account, the cashless wagering system determines whether to authorize the transfer of the determined amount of funds. If the cashless wagering system determines not to authorize the determined amount of funds, the cashless wagering system communicates a denial to the mobile device application, wherein the mobile device application displays a denial of fund transfer to the user. On the other hand, if the cashless wagering system determines to authorize the determined amount of funds, the cashless wagering system updates the cashless wagering account associated with the user (to reflect a reduction of the determined amount of cashable funds) and communicates an authorization to the gaming establishment retail wallet system. The gaming establishment retail wallet system then increases a balance of available funds of the gaming establishment retail account by the transferred amount of funds. The mobile device application proceeds with displaying an updated gaming establishment retail account balance as well as an updated cashless wagering account balance.

Incentives for Transferring Funds from Designated Sources of Funds

In various embodiments, following the establishment of a gaming establishment retail account and the subsequent funding of the gaming establishment retail account, upon the presentation of a retail wallet identity (e.g., a physical card associated with the gaming establishment retail account, a mobile device running a mobile device application associated with the gaming establishment retail account, or a mobile device that presents an identity associated with the player or player's gaming establishment retail account) at an applicable point-of-sale terminal ("POST") of the retail point-of-sale system within or otherwise associated with the gaming establishment for the purchase of goods and/or services, the system determines whether or not to complete the attempted retail purchase.

Figure 2C:
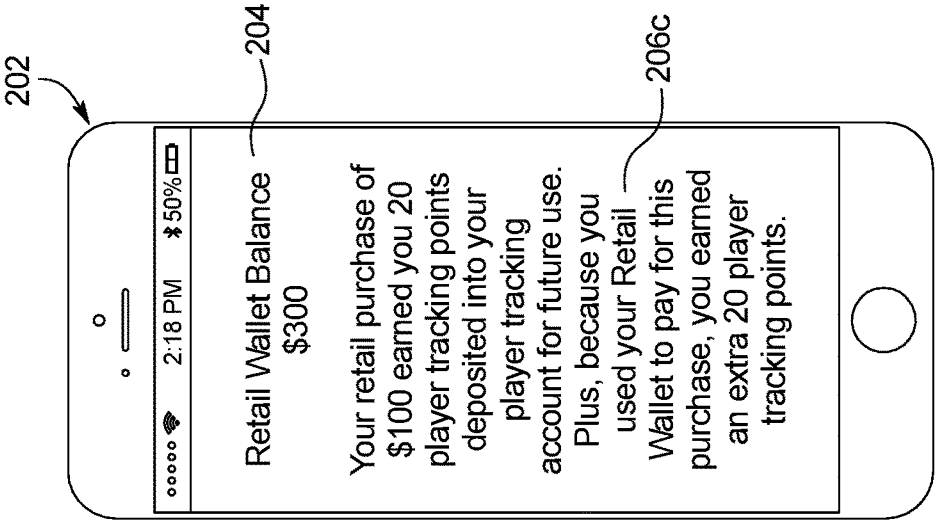
FIGS. 2A, 2B, and 2C are example graphical interfaces displayed on a mobile device in connection with providing an incentive in association with a purchase made utilizing a gaming establishment retail account.
Figure 2B:
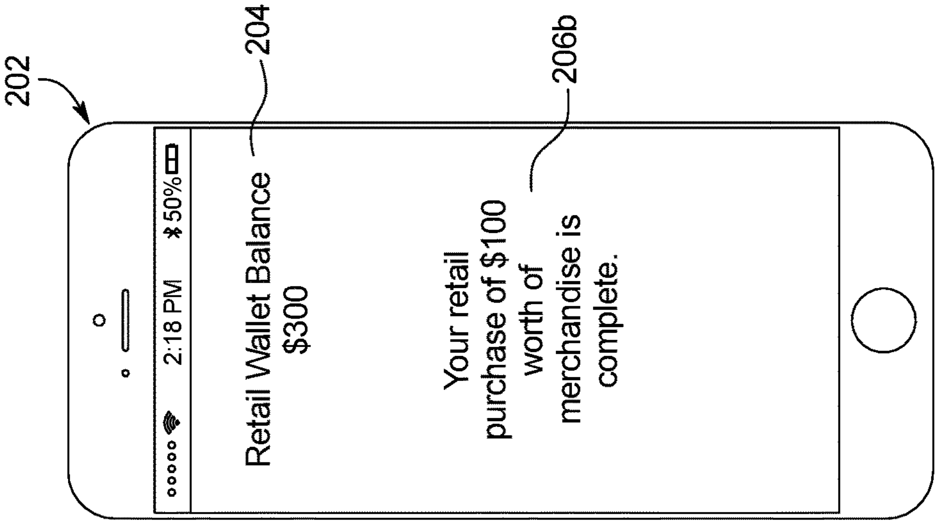
Figure 2A:
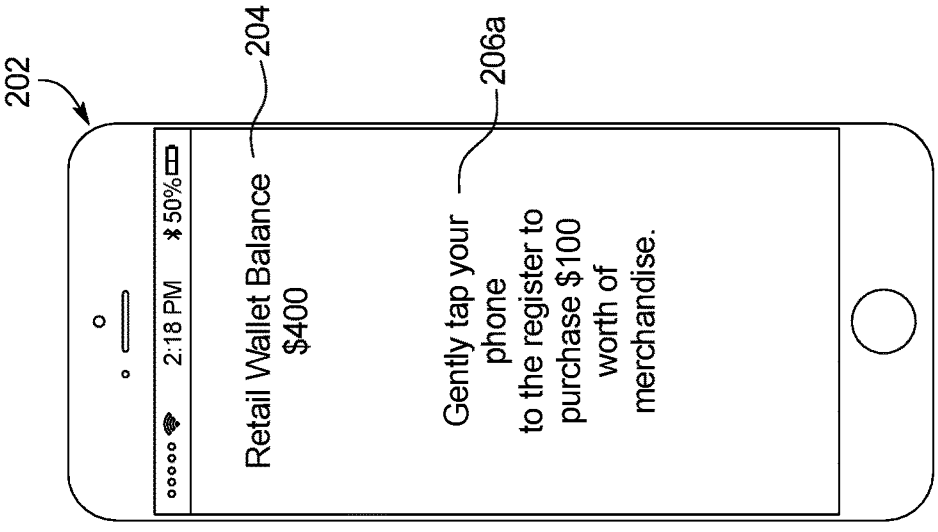

In certain embodiments wherein the purchase of goods and/or services are made with funds maintained in association with a gaming establishment retail account accessed via a mobile device running a mobile device application, to make a purchase of goods and/or services with funds maintained in association with a gaming establishment retail account utilizing a mobile device running a mobile device application, the mobile device application prompts the player to cause the mobile device to engage the POST, such as prompting the player to tap the mobile device to a designated portion of the POST (or otherwise moving the mobile device to within a designated distance of a designated location of the POST). For example, as seen in FIG. 2A, upon launching, on a mobile device 202, a mobile device application 204, the mobile device application displays one or more messages 206*a* that the retail patron has a $400 in their gaming establishment retail account (i.e., the displayed $400 Retail Wallet Balance) and instructs the retail patron to tap the mobile device to the register (i.e., the point of sale terminal) as part of purchasing goods from the retailer for $100. In these embodiments, such engagement initiates a pairing or linkage between the mobile device and the POST (or a component of a gaming establishment fund management system located inside the POST (i.e., a component of the POST)), wherein the pairing or linkage between the mobile device and the POST occurs via one or more applications being run or executed on the mobile device.

In various embodiments, upon receiving data or information regarding the retail wallet identity, the retail point-of-sale system communicates with the gaming establishment retail wallet system to confirm that the gaming establishment retail account has adequate funds for the intended purchase. If the gaming establishment retail wallet system confirms the presence of adequate funds in the gaming establishment retail account, the retail point-of-sale system authorizes the sale of the goods and/or services. In these embodiments, upon the gaming establishment retail wallet system receiving data from the retail point-of-sale system regarding a completion of the purchase, the gaming establishment retail wallet system transfers an amount of funds corresponding to the price of the purchased goods and/or services from the gaming establishment retail account maintained for the retail patron to one or more accounts associated with or otherwise maintained for the retailer. For example, as seen in FIG. 2B, upon determining that the retail patron has a $400 in their gaming establishment retail account, one or more servers of the gaming establishment fund management system transfer the requested $100 from the gaming establishment retail account maintained for the retail patron to an account maintained for the retailer such that the mobile device application 204 of the mobile device 202 displays one or more messages 206*b* regarding the approval of the purchase and that the retail patron now has a $300 in their gaming establishment retail account (i.e., the displayed $300 Retail Wallet Balance). On the other hand, if the gaming establishment retail wallet system indicates that the gaming establishment retail account lacks adequate funds for the purchase, the retail point-of-sale system denies this sale transaction of the goods and/or services using the gaming establishment retail account.

In addition to determining whether or not to complete the attempted retail purchase, the system disclosed herein determines whether or not to provide the retail patron any incentives in association with a completed retail purchase. In these embodiments, based on identifying the retail patron as well as the source of funds used to complete the retail purchase, the system determines zero, one or more incentives to provide the retail patron. That is, in association with a retail purchase, the system provides the retail patron: (i) a first level of benefits, such as no benefits, if the retail patron does not identify themselves to the system, (ii) a second, greater level of benefits if the retail patron identifies themselves to the system and uses a first source of funds to purchase the goods and/or services from the retailer, and (iii) a third, greater level of benefits if the retail patron identifies themselves to the system and uses a second source of funds to purchase the goods and/or services from the retailer. For example, if the retail patron makes a purchase of goods and/or services from a retail establishment using cash and the retail patron does not present any retail wallet identity (or other forms of identification) to the retailer (such that the identity of the retail patron is unknown), the system provides this anonymous retail patron no player tracking points for the purchase. In this example, if the retail patron makes a purchase of goods and/or services from a retail establishment using cash and the retail patron presents a retail wallet identity (or other forms of identification, such as swiping a player tracking card at the POST) to the retailer, the system provides this identified retail patron with a first benefit for the purchase, such as first amount of player tracking points for each dollar spent at the retailer. In this example, if the retail patron makes a purchase of goods and/or services from a retail establishment and the retail patron presents a retail wallet identity to the retailer and further pays for the purchased goods and/or services with an amount of funds transferred from a gaming establishment retail account, the system provides this identified retail patron with a second benefit for the purchase, such as second, greater amount of player tracking points for each dollar spent at the retailer. As illustrated by this example, to incentivize a retail patron to use an amount of funds in a gaming establishment account to complete a retail purchase with a retail establishment, the system provides one or more benefits and/or one or more opportunities to obtain one or more benefits not otherwise available to the retail patron. Put differently, to prioritize using funds in a gaming establishment account to make one or more retail purchases over using other funds to make one or more retail purchases, the system disclosed herein offers retail patron an additional incentive for using funds in a gaming establishment account to make one or more retail purchases.

In certain embodiments, the gaming establishment patron management system, such as a player tracking system, determines the incentive, if any, to provide to the retail patron making the retail purchase. In these embodiments, prior to determining any incentives, information regarding any retail purchases must first be communicated to the gaming establishment patron management system. That is, before determining the level of benefit an identified retail patron is entitled to, the gaming establishment patron management system must first obtain data regarding an identity of retail patron, the purchase, such as the amount of the purchase, and the source of funds utilized to make the purchase, such as whether cash, a credit card, a debit card, a ticket voucher or a transfer of funds from a gaming establishment retail account associated with the retail patron was used to make the purchase.

Figure 3A:
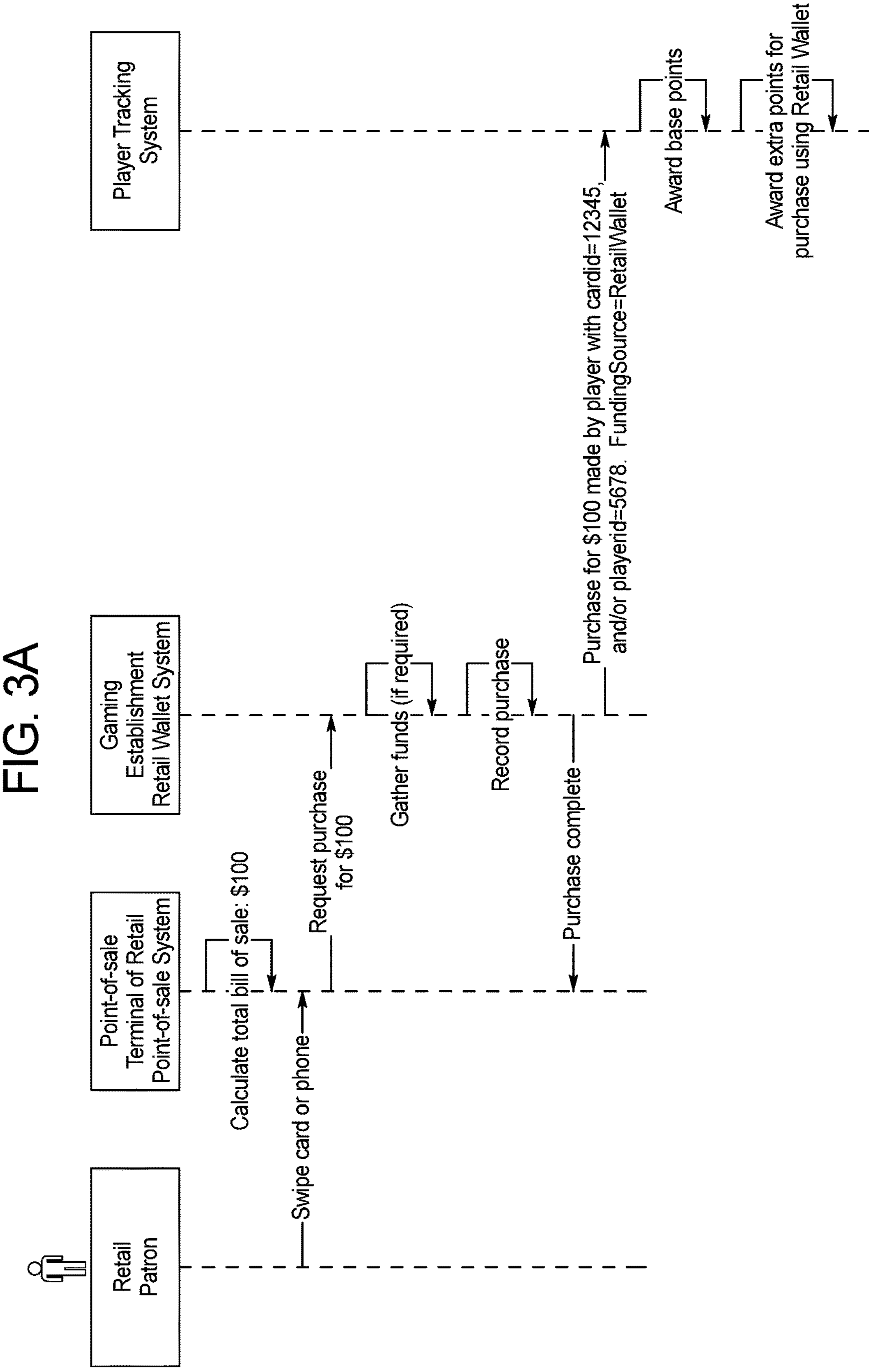
FIG. 3A is an example schematic diagram of the interactions between a retail point-of-sale system, a gaming establishment fund management system, and a gaming establishment patron management system in accordance with one embodiment of providing an incentive in association with a purchase made utilizing a gaming establishment retail account.

In one embodiment, following the completion of a purchase at a retail establishment, the gaming establishment fund management system determines the source of funds utilized to fund the purchase and informs the gaming establishment patron management system information regarding the retail patron, the purchase, and the determined source of funds utilized to make the purchase. In this embodiment, while the POST may, if the funds used to complete the purchase were transferred from a gaming establishment retail account, communicate with the gaming establishment fund management system to cause an amount of funds maintained for the retail patron by the gaming establishment fund management system to be transferred to an account maintained for the retail establishment, the POST does not communicate with the gaming establishment patron management system regarding the retail patron, the purchase, and the source of funds utilized to make the purchase. Rather, in this embodiment, upon determining that the funds used to complete a retail purchase were transferred to the retail establishment from a designated gaming establishment account, such as a gaming establishment retail account, the gaming establishment fund management system informs the gaming establishment patron management system information regarding an identity of the retail patron, an amount of the retail purchase and that the retail purchase occurred following the transfer of funds from a designated gaming establishment account to an account associated with the retailer. For example, as seen in FIG. 3A, following a retail patron presenting a retail wallet identity, in the form of a physical card associated with the gaming establishment retail account or a mobile device running a mobile device application associated with the gaming establishment retail account or a mobile device that presents an identity associated with the retail patron or a mobile device that presents an identity associated with the gaming establishment retail account, at a POST of a retail point-of-sale system to purchase goods and/or services for $100 and following the POST communicating with the retail point-of-sale system to cause a transfer of $100 from the gaming establishment retail account associated with the retail patron to an account associated with the retailer, the gaming establishment retail wallet system of the gaming establishment fund management system communicates to the player tracking system data associated the identity of the retail patron (e.g., Card ID 12345 and/or Player ID 5678) as well as data associated with the purchased goods and/or services were for $100 which was transferred to the account associated with the retailer from the gaming establishment retail account associated with the retail patron. It should be appreciated that since this embodiment utilizes the presented retail wallet identity associated with the gaming establishment retail wallet system of the gaming establishment fund management system to identify the retail patron, the retail patron does not need to identify themselves to the POST. That is, since the gaming establishment fund management system maintains, in association with the presented retail wallet identity, an identification of the retail patron whom made the retail purchase, the purchase of this embodiment does not need to present any gaming establishment patron management system identification, such as a player tracking card, when making the retail purchase at the POST.

Figure 3B:
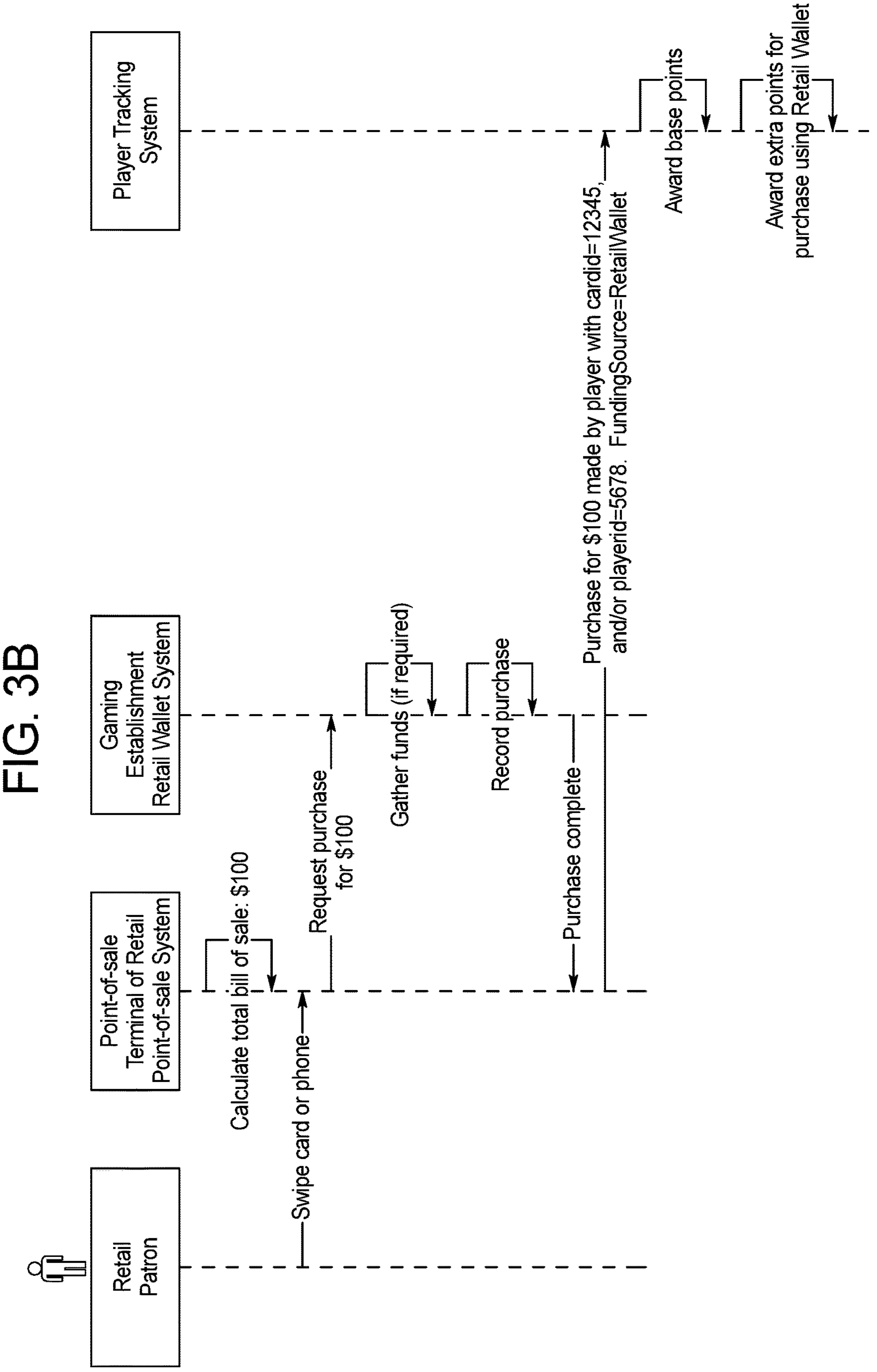
FIG. 3B is an example schematic diagram of the interactions between a retail point-of-sale system, a gaming establishment fund management system, and a gaming establishment patron management system in accordance with another embodiment of providing an incentive in association with a purchase made utilizing a gaming establishment retail account.

In another embodiment, following the completion of a purchase at a retail establishment, the POST determines the source of funds utilized to fund the purchase and informs the gaming establishment patron management system information regarding the retail patron, the purchase, and the determined source of funds utilized to make the purchase. In this embodiment, in addition to communicating with the gaming establishment fund management system to, if the funds used to complete the purchase were transferred from a gaming establishment retail account, cause an amount of funds maintained for the retail patron by the gaming establishment fund management system to be transferred to an account maintained for the retail establishment, the POST also communicates with the gaming establishment patron management system regarding the retail patron, the purchase, and the source of funds utilized to make the purchase. That is, upon determining that the funds used to complete a retail purchase were transferred to the retail establishment from a designated gaming establishment account, such as a gaming establishment retail account, the POST informs the gaming establishment patron management system information regarding an identity of the retail patron, an amount of the retail purchase and that the retail purchase occurred following the transfer of funds from a designated gaming establishment account to an account associated with the retailer. For example, as seen in FIG. 3B, following a retail patron presenting a retail wallet identity, in the form of a physical card associated with the gaming establishment retail account or a mobile device running a mobile device application associated with the gaming establishment retail account or a mobile device that presents an identity associated with the retail patron or a mobile device that presents an identity associated with the gaming establishment retail account, at a POST of a retail point-of-sale system to purchase goods and/or services for $100 and following the POST communicating with the gaming establishment retail wallet system of the gaming establishment fund management system to cause a transfer of $100 from the gaming establishment retail account associated with the retail patron to an account associated with the retailer, the POST communicates to the player tracking system data associated the identity of the retail patron (e.g., Card ID 12345 and/or Player ID 5678) (which was obtained from the presented retail wallet identity or from the retail patron swiping a player tracking card at the POST) as well as data associated with the purchased goods and/or services were for $100 which was transferred to the account associated with the retailer from the gaming establishment retail account associated with the retail patron.

Figure 3C:
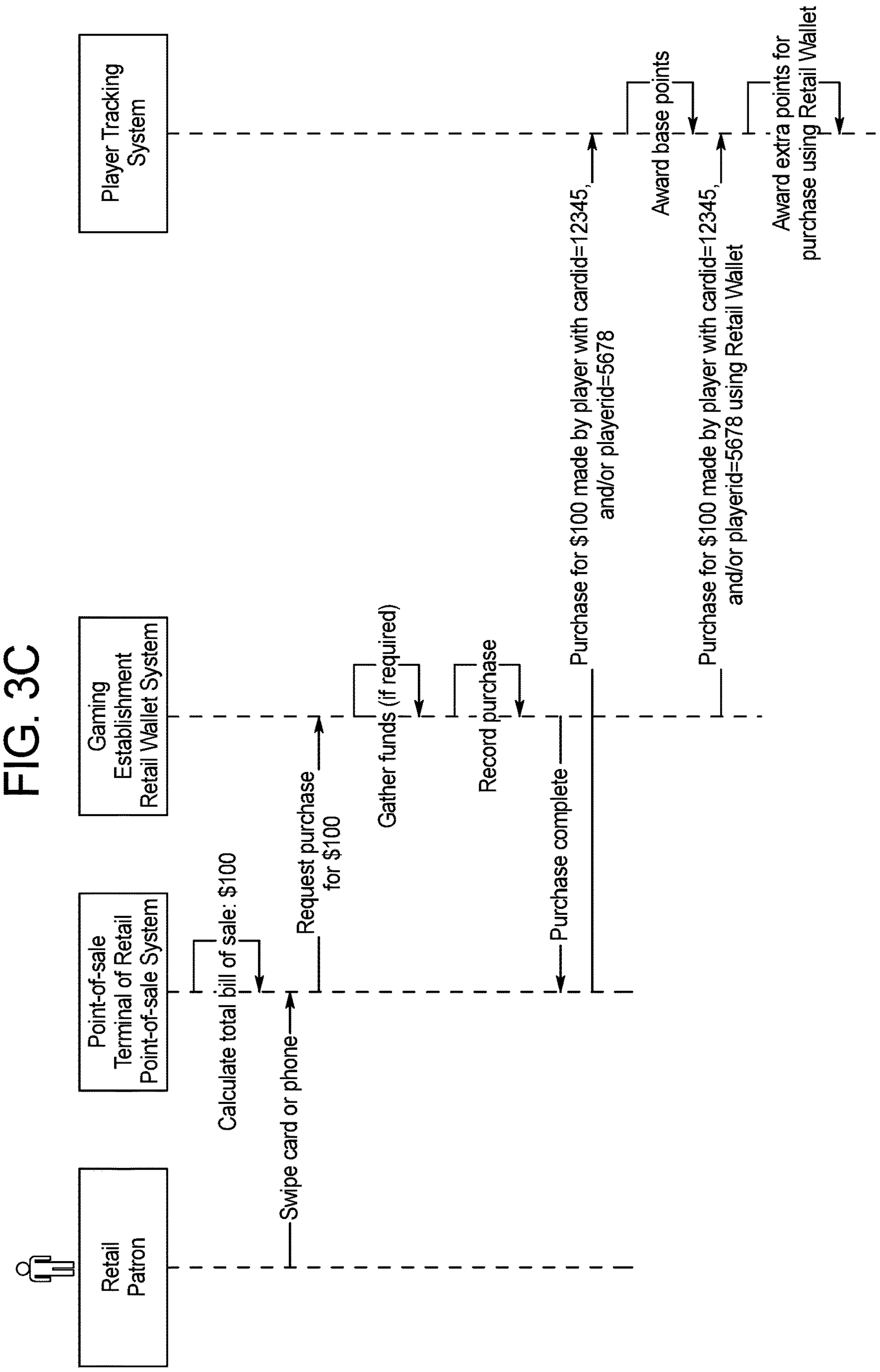
FIG. 3C is an example schematic diagram of the interactions between a retail point-of-sale system, a gaming establishment fund management system, and a gaming establishment patron management system in accordance with another embodiment of providing an incentive in association with a purchase made utilizing a gaming establishment retail account.

In another embodiment, following the completion of a purchase at a retail establishment, the POST informs the gaming establishment patron management system information regarding the retail patron, and the purchase, while the gaming establishment fund management system determines the source of funds utilized to fund the purchase and informs the gaming establishment patron management system information regarding the retail patron, the purchase, and the determined source of funds utilized to make the purchase. In this embodiment, in addition to communicating with the gaming establishment fund management system to, if the funds used to complete the purchase were transferred from a gaming establishment retail account, cause an amount of funds maintained for the retail patron by the gaming establishment fund management system to be transferred to an account maintained for the retail establishment, the POST also communicates with the gaming establishment patron management system regarding the retail patron, and the purchase without communicating with the gaming establishment patron management system regarding the source of funds utilized to make the purchase. Rather, the determined source of funds utilized to complete the retail purchase are separately communicated to the gaming establishment patron management system by the gaming establishment fund management system. For example, as seen in FIG. 3C, following a retail patron presenting a retail wallet identity, in the form of a physical card associated with the gaming establishment retail account or a mobile device running a mobile device application associated with the gaming establishment retail account or a mobile device that presents an identity associated with the retail patron or a mobile device that presents an identity associated with the gaming establishment retail account, at a POST of a retail point-of-sale system to purchase goods and/or services for $100 and following the POST communicating with the gaming establishment retail wallet system of the gaming establishment fund management system to cause a transfer of $100 from the gaming establishment retail account associated with the retail patron to an account associated with the retailer, the POST communicates to the player tracking system data associated the identity of the retail patron (e.g., Card ID 12345 and/or Player ID 5678) (which was obtained from the presented retail wallet identity or from the retail patron swiping a player tracking card at the POST) as well as data associated with the purchased goods and/or services were for $100. In this example, as further seen in FIG. 3C, the gaming establishment retail wallet system of the gaming establishment fund management system separately communicates to the player tracking system data associated the identity of the retail patron (e.g., Card ID 12345 and/or Player ID 5678) (which was obtained from the presented retail wallet identity) as well as data associated with the purchased goods and/or services were for $100 which was transferred to the account associated with the retailer from the gaming establishment retail account associated with the retail patron. It should be appreciated that since the data regarding the source of funds for the completed retail purchase of this embodiment is derived from the gaming establishment fund management system, this embodiment (as well as the embodiment illustrated in FIG. 3A) provides that existing protocols for earning an incentive in association with a retail purchase at a point-of-sale terminal may be used.

In various embodiments, following the receipt of data regarding the retail patron, the purchase, and the source of funds utilized to make the purchase, the gaming establishment patron management system determines one or more incentives to associate with the purchase based on the completed retail purchase and the source of funds utilized to make the purchase. In these embodiments, upon identifying the retail patron of goods and/or services purchased from a retailer, the gaming system patron management system determines, based on the source of funds used to complete the retail purchase, a type of benefit and an amount of the benefit to associated with the identified purchase. In other words, in association with a retail purchase made by an identified purchase, the gaming establishment patron management system determines a first level of benefits to associate with the identified purchase whom paid for the retail purchase using a first source of funds, and determines a second, greater level of benefits to associate with the identified purchase whom paid for the retail purchase using a second source of funds. For example, if an identified retail patron makes a purchase of $100 worth of goods and/or services from a retail establishment using cash, the player tracking system provides this identified retail patron with a base benefit for the purchase, such as twenty player tracking points (using the ratio of one player tracking point per $5 of retail spend). In this example, as seen in FIGS. 3A to 3C, if an identified retail patron makes a purchase of $100 worth of goods and/or services from a retail establishment using funds transferred from a gaming establishment retail account, the player tracking system provides this identified retail patron with a base benefit for the purchase, such as twenty player tracking points (using the ratio of one player tracking point per $5 of retail spend) as well as a bonus benefit for the purchase, such as an additional twenty player tracking points (also using the ratio of one player tracking point per $5 of retail spend). In this example, as seen in FIG. 2C, upon determining that the $100 retail spend was sourced from the gaming establishment retail account maintained for the retail patron, the player tracking system communicates, either directly or indirectly though the gaming establishment fund management system, data to the mobile device 202 such that the mobile device application 204 displays one or more messages 206*c* regarding the base incentive and bonus incentives earned for the retail purchase. It should be appreciated that although not shown, such messages regarding the ability to earn bonus incentives for utilizing a designated source of funds may or may not be displayed to the retail patron prior to the purchase. It should be further appreciated that in different embodiments, such incentives are funded via a portion of the amounts paid to complete the retail purchases (paid by the patron and/or the retail establishment), via a fee paid by the retail establishment and/or via the gaming establishment, such as via gaming establishment marketing funds.

In certain embodiments, the determination of the incentive is based on the amount of the purchase, wherein different amounts of purchases are associated with different incentives. In certain embodiments, the determination of the incentive is based on the amount of funds transferred from a gaming establishment retail account associated with the retail patron to an account associated with the retailer, wherein different amounts of funds are associated with different incentives.

In certain embodiments, the determination of the incentive is additionally or alternatively based on an identity of the retail patron. In one such embodiment, different retail patrons having different status with the gaming establishment are offered different incentives. In another such embodiment, the system determines the incentive based on the historical preferences of the retail patron. In another such embodiment, the system determines the incentive based on the retail patron's wagering activity. In another such embodiment, the system determines the incentive based on the retail patron's gaming establishment retail purchasing activity.

In certain embodiments, the determination of the incentive is additionally or alternatively based on one or more parameters of the retailer, such as an identity of the retailer, the quantity of locations the retailer has associated with the gaming establishment, any promotions being run by the retailer, and/or when the incentive is determined.

In certain embodiments, as indicated above, the determined incentive includes a quantity of player tracking points. In these embodiments, to entice a retail patron to make a purchase via transferring an amount of funds from a gaming establishment retail account associated with the retail patron, the system determines an incentive of an additional quantity of player tracking points. In various embodiments, the determined incentive is based on the purchase price and/or the amount of funds transferred from a gaming establishment retail account to fund the purchase. In certain embodiments, different purchase prices and/or different amounts of funds transferred from a gaming establishment retail account to complete such purchases are associated with different amounts of provided player tracking points.

In certain embodiments, the determined incentive includes a static award, such as a quantity of credits, a comp, a comp balance award or a prize, such as a free item. In one such embodiment, the amount of the static award is based on the amount of the retail purchase and/or the amount of funds transferred from a gaming establishment retail account to fund the purchase, wherein different amounts of funds are associated with different static awards. In another such embodiment, the amount of the static award is additionally or alternatively based on an identification of the retail patron, such as based on a player tracking status of the retail patron and/or a frequency which the retail patron transacts with the retailer, wherein different retail patrons are associated with different static award amounts.

In certain embodiments, the determined incentive includes a player tracking point modifier applicable to a quantity of player tracking points subsequently earned by the retail patron. In these embodiments, in exchange for a retail patron transferring an amount of funds from a gaming establishment retail account to fund a purchase, the system determines an incentive of a player tracking point modifier which can be activated for subsequently earned player tracking points. In certain embodiments, the determined incentive additionally or alternatively includes a player tracking point modifier applicable to a quantity of player tracking points previously earned by the retail patron. In these embodiments, in exchange for a retail patron transferring an amount of funds from a gaming establishment retail account to fund a purchase, the system determines an incentive of a player tracking point modifier which can be activated against previously earned player tracking points (and/or subsequently earned player tracking points).

In certain embodiments, the determined incentive includes a future purchase price modifier. In these embodiments, in exchange for a retail patron transferring an amount of funds from a gaming establishment retail account to fund a purchase, the system determines an incentive of a modifier of the amount of a future retail purchase.

In certain embodiments, the determined incentive includes a quantity of promotional credits, such as non-cashable promotional credits or cashable promotional credits, usable to fund one or more plays of one or more games of chance. In certain other embodiments, the determined incentive additionally or alternatively includes a quantity of promotional credits usable to fund one or more plays of one or more online games of chance accessible remote from the gaming establishment. In certain other embodiments, the determined incentive additionally or alternatively includes a quantity of promotional credits usable to reimburse a player for one or more wagers previously placed. In certain embodiments, different purchase prices and/or amount of funds transferred from gaming establishment retail accounts to fund such purchases are associated with different quantities of promotional credits. It should be appreciated that while such promotional credits have an actual value (i.e., the average expected value of the game(s) played which are funded by such promotional credits), since the games played using such promotional credits may result in one or more awards different than the average expected value of such games, the retail patron may ultimately realize a different valued benefit in exchange for the retail patron making a purchase via transferring an amount of funds from a gaming establishment retail account associated with the retail patron.

In certain embodiments, the determined incentive includes a quantity of virtual credits usable for a play of a social or non-wagering game. In certain embodiments, different amounts of the retail purchase and/or different amounts of funds transferred from a gaming establishment retail account to fund the purchase are associated with different quantities of virtual credits earned as incentives and usable for a play of a social or non-wagering game.

In certain embodiments, the determined incentive includes an entry in a drawing. In one such embodiment, a quantity of entries in the drawing is based on the amount of the purchase, wherein different purchase amounts are associated with different quantities of drawing entries. For example, the system determines an entry into a drawing for each retail dollar spent. In another such embodiment, a quantity of entries in the drawing is additionally or alternatively based on an identification of the retail patron, such as based on a player tracking status of the retail patron and/or a frequency which the retail patron transacts with the retailer, wherein different retail patrons are associated with different quantities of drawing entries.

In certain embodiments, the determined incentive includes one or more free (or reduced cost) plays of one or more games of chance. In certain other embodiments, the determined incentive includes one or more free (or reduced cost) plays of one or more online games of chance accessible remote from the gaming establishment. In one such embodiment, a quantity of plays of the game of chance is based on the amount of the retail purchase and/or the amount of funds transferred from a gaming establishment retail account to fund the purchase, wherein different amounts of funds are associated with different quantities of plays of the game of chance. In another such embodiment, a quantity of plays of the game of chance is additionally or alternatively based on an identification of the retail patron, such as based on a player tracking status of the retail patron and/or a frequency which the retail patron transacts with the retailer, wherein different retail patrons are associated with different quantities of plays of the game of chance. In another such embodiment, a quantity of plays of the game of chance is additionally or alternatively based on the amount of the retail purchase and/or the amount of funds transferred from a gaming establishment retail account to fund the purchase, wherein different amounts of funds are associated with different quantities of plays of the game of chance. In these embodiments, such games of chance include, but are not limited to: a play of any suitable slot game; a play of any suitable wheel game; a play of any suitable card game; a play of any suitable offer and acceptance game; a play of any suitable award ladder game; a play of any suitable puzzle-type game; a play of any suitable persistence game; a play of any suitable selection game; a play of any suitable cascading symbols game; a play of any suitable ways to win game; a play of any suitable scatter pay game; a play of any suitable coin-pusher game; a play of any suitable elimination game; a play of any suitable stacked wilds game; a play of any suitable trail game; a play of any suitable bingo game; a play of any suitable video scratch-off game; a play of any suitable pick-until-complete game; a play of any suitable shooting simulation game; a play of any suitable racing game; a play of any suitable promotional game; a play of any suitable high-low game; a play of any suitable lottery game; a play of any suitable number selection game; a play of any suitable dice game; a play of any suitable skill game; a play of any suitable auction game; a play of any suitable reverse-auction game; a play of any suitable group game; a play of any suitable game in a service window; a play of any suitable game on a mobile device; and/or a play of any suitable game disclosed herein.

In certain embodiments, the determined incentive is associated with a mystery award. In one such embodiment, the system contributes part or all of the purchase price of one or more goods and/or services to a pool, such as a benefit amount pool. In another such embodiment, the system additionally or alternatively contributes part of the amount of funds transferred from a gaming establishment retail account to fund the purchase to a pool, such as a benefit amount pool. In different embodiments, the pool includes a single level or multiple levels associated with multiple values that are funded based on purchase price of the goods and/or services and/or the amount of funds transferred from a gaming establishment retail account to fund the purchase.

It should be appreciated that in these embodiments, since one or more entries into one or more drawings, one or more plays of one or more games of chance and/or one or more chances to win part or all of a pool may or may not result in an award for the retail patron, such incentives are opportunities to obtain one or more benefits in association with transferring an amount of funds from a gaming establishment retail account to fund a purchase. That is, while such incentives have an average expected value (i.e., a theoretical value which is based on the awards available and the probability of obtaining any of such awards), since one or more random determinations subsequently occur in association with the determined incentive and an actual value of the determined incentive (i.e., the benefit associated with the determined incentive) is based on the results of such random determinations (wherein the actual value may be a lucrative value or a value of zero), these determined incentives may be viewed as opportunities to obtain a benefit.

In certain embodiments, the determined incentive includes one or more features usable in association with a play of a game. That is, the determined incentive is associated with one or more plays of one or more games, such as a modification to one or more game play features and/or an addition of one or more game play features. In certain of these embodiments, the determined incentive includes altering or otherwise modify one or more features, aspects or parameters of one or more subsequently played games. In these embodiments, a determined incentive includes any suitable feature which modifies any aspect of any game subsequently played by the retail patron which is associated with the offered incentive. In various embodiments, one or more features employed as a determined incentive to modify one or more aspects of one or more such games subsequently played include, but are not limited to: a feature modifying one or more symbols available to be generated for a subsequent play of a game associated with the offered incentive; a feature modifying one or more wild symbols available to be generated for a subsequent play of a game associated with the offered incentive; a feature modifying a quantity of reels to be used for a subsequent play of a game associated with the offered incentive; a feature modifying which of a plurality of reel are to be used for a subsequent play of a game associated with the offered incentive; a feature modifying a deck of playing cards to be used for a subsequent play of a game associated with the offered incentive; a feature modifying a quantity of playing cards to be used for a subsequent play of a game associated with the offered incentive; a feature modifying a quantity of poker hands to be dealt for a subsequent play of a game associated with the offered incentive; a book-end wild symbols feature; a stacked wild symbols feature; an expanding wild symbols feature; a retrigger symbol feature; an anti-terminator symbol feature; a locking reel feature, a locking symbol position feature; a modifier, such as a multiplier, feature; a feature modifying an amount of credits of a credit balance; a feature modifying an amount of promotional credits; a feature modifying a placed wager amount; a feature modifying a placed side wager amount; a feature modifying a rate of earning player tracking points; a feature modifying a rate of earning promotional credits; a feature modifying a rate of earning virtual credits; a feature modifying a number of wagered on paylines; a feature modifying a wager placed on one or more paylines (or on one or more designated paylines); a feature modifying a number of ways to win wagered on; a feature modifying a wager placed on one or more ways to win (or on one or more designated ways to win); a feature modifying an average expected payback percentage of a subsequent play of a game associated with the offered incentive; a feature modifying an average expected payout of a subsequent play of a game associated with the offered incentive; a feature modifying one or more awards available; a feature modifying a range of awards available; a feature modifying a type of awards available; a feature modifying one or more progressive awards; a feature modifying which progressive awards are available to be won; a feature modifying one or more modifiers, such as multipliers, available; a feature modifying an activation of a reel (or a designated reel); a feature modifying an activation of a plurality of reels; a feature modifying a generated outcome (or a designated generated outcome); a feature modifying a generated outcome (or a designated generated outcome) associated with an award over a designated value; a feature modifying a generated outcome (or a designated generated outcome) on a designated payline; a feature modifying a generated outcome (or a designated generated outcome) in a scatter configuration; a feature modifying a winning way to win (or a designated winning way to win); a feature modifying a designated symbol or symbol combination; a feature modifying a generation of a designated symbol or symbol combination on a designated payline; a feature modifying a generation of a designated symbol or symbol combination in a scatter configuration; a feature modifying a triggering event of a play of a secondary or bonus game; a feature modifying an activation of a secondary or bonus display (such as an award generator); a feature modifying a quantity of activations of a secondary or bonus display (e.g., a feature modifying a quantity of spins of an award generator); a feature modifying a quantity of sections of a secondary or bonus display (e.g., a feature modifying a quantity of sections of an award generator); a feature modifying one or more awards of a secondary or bonus display; a feature modifying an activation of a community award generator; a feature modifying a quantity of activations of a community award generator; a feature modifying a quantity of sections of a community award generator; a feature modifying one or more awards of a community award generator; a feature modifying a generated outcome (or a designated generated outcome) in a secondary game; a feature modifying a quantity of picks in a selection game; a feature modifying a quantity of offers in an offer and acceptance game; a feature modifying a quantity of moves in a trail game; a feature modifying an amount of free spins provided; a feature modifying a game terminating or ending condition; a feature modifying an availability of a secondary game; and/or a feature modifying any game play feature associated with any play of any game disclosed herein.

In certain embodiments, the funding of the determined incentive is based on a percentage of the purchase prices paid for goods and/or services. In certain embodiments, the funding of the determined incentive is additionally or alternatively based on a percentage of the amounts transferred from gaming establishment retail accounts associated with one or more retail patrons to an account associated with the retailer. In certain embodiments, the funding of the determined incentive is additionally or alternatively based on an amount of gaming establishment marketing funds (i.e., funds contributed from a gaming establishment marketing department).

It should be further appreciated that providing one or more incentives in association with a purchase at a retail establishment utilizes one or more components of the gaming establishment fund management system, the gaming establishment patron management system and/or the retail point-of-sale system. In these embodiments, such components of the gaming establishment fund management system, the gaming establishment patron management system, and/or the retail point-of-sale system each include a controller including at least one processor. The at least one processor is any suitable processing device or set of processing devices, such as a microprocessor, a microcontroller-based platform, a suitable integrated circuit, or one or more application-specific integrated circuits (ASICs), configured to execute software enabling various configuration and reconfiguration tasks, such as: (1) communicating with a remote source (such as a server that stores authentication information or fund information) via a communication interface of the controller; (2) converting signals read by an interface to a format corresponding to that used by software or memory of the component of the gaming establishment fund management system, the gaming establishment patron management system, and/or the retail point-of-sale system; (3) accessing memory to configure or reconfigure parameters in the memory according to indicia read from the component of the gaming establishment fund management system, the gaming establishment patron management system, and/or the retail point-of-sale system; (4) communicating with interfaces and the peripheral devices (such as input/output devices); and/or (5) controlling the peripheral devices. In certain embodiments, one or more components of the controller (such as the at least one processor) reside within a housing of the component of the gaming establishment fund management system, the gaming establishment patron management system, and/or the retail point-of-sale system, while in other embodiments, at least one component of the controller resides outside of the housing of the component of the gaming establishment fund management system, the gaming establishment patron management system, and/or the retail point-of-sale system.

The controller also includes at least one memory device, which includes: (1) volatile memory (e.g., RAM which can include non-volatile RAM, magnetic RAM, ferroelectric RAM, and any other suitable forms); (2) non-volatile memory (e.g., disk memory, FLASH memory, EPROMs, EEPROMs, memristor-based non-volatile solid-state memory, etc.); (3) unalterable memory (e.g., EPROMs); (4) read-only memory; and/or (5) a secondary memory storage device, such as a non-volatile memory device, configured to store software related information (the software related information and the memory may be used to store various files not currently being used and invoked in a configuration or reconfiguration). Any other suitable magnetic, optical, and/or semiconductor memory may operate in conjunction with the component of the gaming establishment fund management system, the gaming establishment patron management system, and/or the retail point-of-sale system disclosed herein. In certain embodiments, the at least one memory device resides within the housing of the component of the gaming establishment fund management system, the gaming establishment patron management system, and/or the retail point-of-sale system, while in other embodiments at least one component of the at least one memory device resides outside of the housing of the component of the gaming establishment fund management system, the gaming establishment patron management system, and/or the retail point-of-sale system. In these embodiments, any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

The at least one memory device is configured to store, for example: (1) configuration software, such as all the parameters and settings on the component of the gaming establishment fund management system, the gaming establishment patron management system, and/or the retail point-of-sale system; (2) associations between configuration indicia read from a component of the gaming establishment fund management system with one or more parameters and settings; (3) communication protocols configured to enable the at least one processor to communicate with the peripheral devices; and/or (4) communication transport protocols (such as TCP/IP, USB, Firewire, IEEE1394, Bluetooth, IEEE 802.11x (IEEE 802.11 standards), hiperlan/2, HomeRF, etc.) configured to enable the component of the gaming establishment fund management system, the gaming establishment patron management system, and/or the retail point-of-sale system to communicate with local and non-local devices using such protocols. In one implementation, the controller communicates with other devices using a serial communication protocol. A few non-limiting examples of serial communication protocols that other devices, such as peripherals (e.g., a bill validator or a ticket printer), may use to communicate with the controller include USB, RS-232, and Netplex (a proprietary protocol developed by IGT).

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the player's computer, partly on the player's computer, as a stand-alone software package, partly on the player's computer and partly on a remote computer or entirely on the remote computer or server. In the latter scenario, the remote computer may be connected to the player's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

In certain embodiments, the at least one memory device is configured to store program code and instructions executable by the at least one processor of the component of the gaming establishment fund management system, the gaming establishment patron management system, and/or the retail point-of-sale system to control the component of the gaming establishment fund management system, the gaming establishment patron management system, and/or the retail point-of-sale system. In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a retail patron uses such a removable memory device in a component of the gaming establishment fund management system to implement at least part of the present disclosure. In other embodiments, part or all of the program code and/or the operating data is downloaded to the at least one memory device of the component of the gaming establishment fund management system, the gaming establishment patron management system, and/or the retail point-of-sale system through any suitable data network described above (such as an Internet or intranet).

The at least one memory device also stores a plurality of device drivers. Examples of different types of device drivers include device drivers for the component of the gaming establishment fund management system, the gaming establishment patron management system, and/or the retail point-of-sale system and device drivers for the peripheral components. Typically, the device drivers utilize various communication protocols that enable communication with a particular physical device. The device driver abstracts the hardware implementation of that device. For example, a device driver may be written for each type of card reader that could potentially be connected to the component of the gaming establishment fund management system, the gaming establishment patron management system, and/or the retail point-of-sale system. Non-limiting examples of communication protocols used to implement the device drivers include Netplex, USB, Serial, Ethernet, Firewire, I/O debouncer, direct memory map, serial, PCI, parallel, RF, Bluetooth™, near-field communications (e.g., using near-field magnetics), 802.11 (WiFi), etc. In one embodiment, when one type of a particular device is exchanged for another type of the particular device, the at least one processor of the component of the gaming establishment fund management system, the gaming establishment patron management system, and/or the retail point-of-sale system loads the new device driver from the at least one memory device to enable communication with the new device. For instance, one type of card reader in the component of the gaming establishment fund management system, the gaming establishment patron management system, and/or the retail point-of-sale system can be replaced with a second different type of card reader when device drivers for both card readers are stored in the at least one memory device.

In certain embodiments, the software units stored in the at least one memory device can be upgraded as needed. For instance, when the at least one memory device is a hard drive, new parameters, new settings for existing parameters, new settings for new parameters, new device drivers, and new communication protocols can be uploaded to the at least one memory device from the controller or from some other external device. As another example, when the at least one memory device includes a CD/DVD drive including a CD/DVD configured to store options, parameters, and settings, the software stored in the at least one memory device can be upgraded by replacing a first CD/DVD with a second CD/DVD. In yet another example, when the at least one memory device uses flash memory or EPROM units configured to store options, parameters, and settings, the software stored in the flash and/or EPROM memory units can be upgraded by replacing one or more memory units with new memory units that include the upgraded software. In another embodiment, one or more of the memory devices, such as the hard drive, may be employed in a software download process from a remote software server.

In some embodiments, the at least one memory device also stores authentication and/or validation components configured to authenticate/validate specified component of the gaming establishment fund management system components and/or information, such as hardware components, software components, firmware components, peripheral device components, user input device components, information received from one or more user input devices, information stored in the at least one memory device, etc.

In certain embodiments, the peripheral devices include several device interfaces, such as, but not limited to: (1) at least one output device including at least one display device; (2) at least one input device (which may include contact and/or non-contact interfaces); (3) at least one transponder; (4) at least one wireless communication component; (5) at least one wired/wireless power distribution component; (6) at least one sensor; (7) at least one data preservation component; (8) at least one motion/gesture analysis and interpretation component; (9) at least one motion detection component; (10) at least one portable power source; (11) at least one geolocation module; (12) at least one user identification module; (13) at least one user/device tracking module; and (14) at least one information filtering module.

As indicated above, in various embodiments, one or more actions occur between a mobile device and one or more components of the gaming establishment fund management system, the gaming establishment patron management system and/or the retail point-of-sale system, via one or more wireless communication protocols between the mobile device and the component of the gaming establishment fund management system, the gaming establishment patron management system and/or the retail point-of-sale system.

In certain embodiments, the communication with the mobile device can occur through one or more wireless interfaces of the component of the gaming establishment fund management system, the gaming establishment patron management system and/or the retail point-of-sale system. In one embodiment, the wireless interface is integrated into the cabinet of the component of the gaming establishment fund management system, the gaming establishment patron management system and/or the retail point-of-sale system and the processor of the component of the gaming establishment fund management system, the gaming establishment patron management system and/or the retail point-of-sale system is configured to communicate directly with and send control commands to the wireless interface. In another embodiment, the wireless interface is integrated into a device mounted to and/or within the cabinet of the component of the gaming establishment fund management system, the gaming establishment patron management system and/or the retail point-of-sale system. In certain embodiments where the wireless interface is embedded in a secondary device, the processor of the component of the gaming establishment fund management system, the gaming establishment patron management system and/or the retail point-of-sale system sends control commands to control the wireless interface via a secondary controller.

In certain embodiments which utilize a near field communication (NFC) implementation, the mobile device application registers a mobile device application with one or more processors of the mobile device. In these embodiments, when the mobile device is detected by an NFC reader of a component of the gaming establishment fund management system, the gaming establishment patron management system and/or the retail point-of-sale system, the component of the gaming establishment fund management system, the gaming establishment patron management system and/or the retail point-of-sale system communicates one or more data messages to the mobile device (or to one or more servers which then communicate such data messages to the mobile device). Such data messages are commands generated by the component of the gaming establishment fund management system, the gaming establishment patron management system and/or the retail point-of-sale system when the mobile device is detected in the NFC reader field. The processor of the mobile device communicates the data message to the mobile device application. The mobile device application responds, such as communicating a triggering message, and a communication channel is opened between the component of the gaming establishment fund management system, the gaming establishment patron management system and/or the retail point-of-sale system and the mobile device application (or between the component of the gaming establishment fund management system, the gaming establishment patron management system and/or the retail point-of-sale system, one or more servers and the mobile device application). This open communication channel enables the component of the gaming establishment fund management system, the gaming establishment patron management system and/or the retail point-of-sale system to send, though the NFC reader, additional data messages to the mobile device (or to the mobile device via one or more servers) which are responded to by the mobile device application of the mobile device. It should be appreciated that as long as the mobile device remains within the NFC field, the component of the gaming establishment fund management system, the gaming establishment patron management system and/or the retail point-of-sale system is configured to communicate with the mobile device and send data, such as status updates, as necessary. However, once the mobile device is removed from the NFC field, the communication channel is closed and such status updates must be discontinued.

In other embodiments, the wireless interface implements a Wi-Fi, cellular and/or Bluetooth™ communications protocol to facilitate the communication of data between the mobile device and the component of the gaming establishment fund management system, the gaming establishment patron management system and/or the retail point-of-sale system. In such embodiments, Bluetooth™ pairing occurs when two Bluetooth devices agree to communicate with each other and establish a connection. In order to pair two Bluetooth wireless devices, a password (passkey) is exchanged between the two devices. The Passkey is a code shared by both Bluetooth devices, which proves that both users have agreed to pair with each other. After the passkey code is exchanged, an encrypted communication can be set up between the pair devices. In Wi-Fi paring, every pairing can be set up with WPA2 encryption or another type of encryption scheme to keep the transfer private. Wi-Fi Direct is an example of a protocol that can be used to establish point-to-point communications between two Wi-Fi devices. The protocol enables for a Wi-Fi device pair directly with another without having to first join a local network.

It should be appreciated that Wi-Fi, cellular or Bluetooth™ communication protocols can be used in lieu of or in combination with NFC. For instance, an NFC communication can be used to instantiate a Wi-Fi or Bluetooth™ communication between the component of the gaming establishment fund management system, the gaming establishment patron management system and/or the retail point-of-sale system, zero, one or more servers and a mobile device, such as secure pairing using one of these protocols. That is, in one embodiment, an NFC interface on a component of the gaming establishment fund management system, the gaming establishment patron management system and/or the retail point-of-sale system can be used to set-up a higher speed communication between the component of the gaming establishment fund management system, the gaming establishment patron management system and/or the retail point-of-sale system, zero, one or more servers and the NFC enabled mobile device. The higher speed communication rates can be used for expanded content sharing. For instance, a NFC and Bluetooth enabled component of the gaming establishment fund management system, the gaming establishment patron management system and/or the retail point-of-sale system can be tapped by an NFC and Bluetooth enabled mobile device for instant Bluetooth pairing between the devices and zero, one or more servers. Instant Bluetooth pairing between a component of the gaming establishment fund management system, the gaming establishment patron management system and/or the retail point-of-sale system, an NFC enabled mobile device and zero, one or more servers, can save searching, waiting, and entering codes. In another example, a component of the gaming establishment fund management system, the gaming establishment patron management system and/or the retail point-of-sale system can be configured as an NFC enabled router, such as a router supporting a Wi-Fi communication standard. Tapping an NFC enabled mobile device to an NFC enabled and Wi-Fi enabled component of the gaming establishment fund management system, the gaming establishment patron management system and/or the retail point-of-sale system can be used to establish a Wi-Fi connection between the devices and zero, one or more servers.

In certain embodiments which implement a Wi-Fi, cellular and/or Bluetooth™ communications protocol, the system utilizes one or more QR codes generated by the component of the gaming establishment fund management system, the gaming establishment patron management system and/or the retail point-of-sale system to facilitate the communication of data between the mobile device and the system. In such embodiments, the QR code is used to identify the component of the gaming establishment fund management system, the gaming establishment patron management system and/or the retail point-of-sale system that is displaying the QR code to identify the server to which the mobile device should connect. It should be appreciated that the QR code enables the system to establish a secure tunnel or path from the mobile device to the gaming establishment's Wi-Fi network and then to the gaming establishment's wired network and finally to the component of the gaming establishment fund management system, the gaming establishment patron management system and/or the retail point-of-sale system. In these embodiments, a communication tunnel wrapper (i.e., a Wi-Fi/Bluetooth™ tunnel wrapper) is utilized to establish a connection between the system and the mobile device and to transport any data messages described herein between the component of the gaming establishment fund management system, the gaming establishment patron management system and/or the retail point-of-sale system, zero, one or more servers and the mobile device.

More specifically, in certain embodiments, the user requests, via an input at the component of the gaming establishment fund management system, the gaming establishment patron management system and/or the retail point-of-sale system and/or the mobile device, the generation of a QR code by the component of the gaming establishment fund management system, the gaming establishment patron management system and/or the retail point-of-sale system. In response to the user's request, the component of the gaming establishment fund management system, the gaming establishment patron management system and/or the retail point-of-sale system displays a QR code. In certain embodiments, the QR code includes a nonce which prevents a third-party (e.g., another user) from sniping the user's login attempt. Such an on-demand QR code remains valid for a designated amount of time such that if the user does not scan the QR code within the designated amount of time, another QR code is necessary to be scanned to connect the mobile device to the component of the gaming establishment fund management system, the gaming establishment patron management system and/or the retail point-of-sale system.

In these embodiments, the user scans the QR code with the mobile device application. If the system determines that the QR code is valid (i.e., not expired), the mobile device application will connect to the system. It should be appreciated that as long as the established connection between the mobile device and the system remains active, one or more system servers and mobile device may communicate data, such as status updates, as necessary. It should be further appreciated that in association with the Wi-Fi or Bluetooth™ or mobile device network communications protocol described herein, any action requested by the user via the mobile device application does not require a new engagement between the mobile device and the component of the gaming establishment fund management system, the gaming establishment patron management system and/or the retail point-of-sale system, such as a new scanning of the QR code to send such a requested action from the mobile device to the component of the gaming establishment fund management system, the gaming establishment patron management system and/or the retail point-of-sale system (or to send a requested action from the mobile device to one or more servers and then from one or more servers to the component of the gaming establishment fund management system, the gaming establishment patron management system and/or the retail point-of-sale system).

In certain embodiments, following the scanning of a valid QR code, the mobile device application connects to one or more servers. In certain embodiments, after establishing a connection with one or more servers, the mobile device application transmits a connect command to the system. In response to receiving a connect command from the mobile device, the system sends a message to the mobile device. This message serves to encapsulate various commands between the system and the mobile device. In these embodiments, if the mobile device application does not receive this message within a designated period of time, such as within five seconds, the mobile device application displays an error message to the user and directs the user to rescan the QR code.

In addition to the connect command communicated from the mobile device application to the system, the mobile device application of these embodiments is configured to send a disconnect command to the system. Such a disconnect command functions to tear-down the connection the server. It should be appreciated that if the mobile device connection is severed before this command is received by the system, the sever sends this command on behalf of the mobile device application;

In another embodiment, the mobile device application is configured to send a trigger command to the system, such as a component of the gaming establishment fund management system, the gaming establishment patron management system and/or the retail point-of-sale system. In this embodiment, the trigger command is associated with an action requested by the user. In such embodiments, when the system receives the trigger command from the mobile device application, the system will communicate the appropriate requests to the mobile device application. If the mobile device application does not receive these requests within a designated amount of time, such as five seconds, the mobile device application will display an error message to the user and enable the user to retry the requested action.

In other embodiments, the mobile device application communicates with the system through a tunnel established over the mobile device's Wi-FI network or the mobile device's network connection. In such embodiments, the mobile device application will connect to one or more system servers which use websockets secured with a transport layer security protocol. The system server operates with one or more translators, similarly using websockets secured with a transport layer security protocol to communicate data to the component of the gaming establishment fund management system, the gaming establishment patron management system and/or the retail point-of-sale system.

In certain embodiments which utilize the NFC communication protocol described herein, which utilize the Wi-Fi, cellular and/or Bluetooth™ communication protocols described herein and/or which utilize any other communication protocol described herein, any action requested by the user via the mobile device application requires a new engagement between the mobile device and the component of the gaming establishment fund management system, the gaming establishment patron management system and/or the retail point-of-sale system, such as a new tap of the mobile device to a card reader or other designated location(s) of the component of the gaming establishment fund management system, the gaming establishment patron management system and/or the retail point-of-sale system. In certain other embodiments which utilize the NFC communication protocol described herein, which utilize the Wi-Fi, cellular and/or Bluetooth™ communication protocols described herein and/or which utilize any other communication protocol described herein, certain actions requested by the user via the mobile device application requires a new engagement between the mobile device and the component of the gaming establishment fund management system, the gaming establishment patron management system and/or the retail point-of-sale system, such as a new tap of the mobile device to a card reader or other designated location(s) of the component of the gaming establishment fund management system, the gaming establishment patron management system and/or the retail point-of-sale system and other actions requested by the user via the mobile device application do not require any new engagement between the mobile device and the component of the gaming establishment fund management system, the gaming establishment patron management system and/or the retail point-of-sale system.

It should be appreciated that while certain data or information pertaining to one or more of the requested actions are communicated between a component of the gaming establishment fund management system, the gaming establishment patron management system and/or the retail point-of-sale system and a mobile device, such data or information may additionally or alternatively be communicated: (i) between one or more servers and a mobile device via one or more wireless communication protocols, or (ii) between a component of the gaming establishment fund management system, the gaming establishment patron management system and/or the retail point-of-sale system and one or more servers via one or more wireless communication protocols and then from one or more servers to a mobile device via one or more wireless communication protocols.

It should additionally be appreciated that any functionality or process described herein may be implemented via one or more servers, a component of the gaming establishment fund management system, the gaming establishment patron management system and/or the retail point-of-sale system, or a mobile device application. For example, while certain data or information described herein is explained as being communicated from a component of the gaming establishment fund management system, the gaming establishment patron management system and/or the retail point-of-sale system to a mobile device via one or more wireless communication protocols, such data or information may additionally or alternatively be communicated from one or more servers to a mobile device via one or more wireless communication protocols. Accordingly: (i) while certain functions, features or processes are described herein as being performed by a component of the gaming establishment fund management system, the gaming establishment patron management system and/or the retail point-of-sale system, such functions, features or processes may alternatively be performed by one or more servers, or one or more mobile device applications, (ii) while certain functions, features or processes are described herein as being performed by one or more mobile device applications, such functions, features or processes may alternatively be performed by one or more servers, or one or more components of the gaming establishment fund management system, the gaming establishment patron management system and/or the retail point-of-sale systems, (iii) while certain functions, features or processes are described herein as being performed by one or more servers, such functions, features or processes may alternatively be performed by one or more components of the gaming establishment fund management system, the gaming establishment patron management system and/or the retail point-of-sale systems, or one or more mobile device applications, and (iv) while certain functions, features or processes are described herein as being performed by one or more components of the gaming establishment fund management system, the gaming establishment patron management system and/or the retail point-of-sale system, such functions, features or processes may alternatively be performed by one or more mobile device applications, or one or more servers.

It should be appreciated that the terminology used herein is for the purpose of describing particular aspects only and is not intended to be limiting of the disclosure. For example, the singular forms "a", "an" and "the" are intended to include the plural forms as well, unless the context clearly indicates otherwise. In another example, the terms "including" and "comprising" and variations thereof, when used in this specification, specify the presence of stated features, steps, operations, elements, and/or components, but do not preclude the presence or addition of one or more other features, steps, operations, elements, components, and/or groups thereof. Additionally, a listing of items does not imply that any or all of the items are mutually exclusive nor does a listing of items imply that any or all of the items are collectively exhaustive of anything or in a particular order, unless expressly specified otherwise. Moreover, as used herein, the term "and/or" includes any and all combinations of one or more of the associated listed items. It should be further appreciated that headings of sections provided in this document and the title are for convenience only, and are not to be taken as limiting the disclosure in any way. Furthermore, unless expressly specified otherwise, devices that are in communication with each other need not be in continuous communication with each other and may communicate directly or indirectly through one or more intermediaries.

Various changes and modifications to the present embodiments described herein will be apparent to those skilled in the art. For example, a description of an embodiment with several components in communication with each other does not imply that all such components are required, or that each of the disclosed components must communicate with every other component. On the contrary a variety of optional components are described to illustrate the wide variety of possible embodiments of the present disclosure. As such, these changes and modifications can be made without departing from the spirit and scope of the present subject matter and without diminishing its intended technical scope. It is therefore intended that such changes and modifications be covered by the appended claims.

The invention is claimed as follows:

1. A system comprising:

a processor; and a memory device that stores a plurality of instructions that, when executed by the processor, cause the processor to:

responsive to a receipt of data associated with a completion of a retail purchase, receive data associated with a determined source of funds used to complete the retail purchase, and responsive to the determined source of funds used to complete the retail purchase being a designated source of funds:

determine a first incentive comprising a base incentive not associated with the designated source of funds and a bonus incentive associated with the designated source of funds, associate the determined first incentive with a retail patron, and cause a display device to display the determined first incentive associated with the retail patron.

2. The system of claim 1, wherein when executed by the processor responsive to the determined source of funds used to complete the retail purchase being a non-designated source of funds, the instructions cause the processor to determine a second incentive comprising the base incentive.

3. The system of claim 1, wherein the data associated with the completion of the retail purchase is received from a point-of-sale terminal associated with the completion of the retail purchase.

4. The system of claim 3, wherein the data associated with the determined source of funds used to complete the retail purchase is received from the point-of-sale terminal associated with the completion of the retail purchase.

5. The system of claim 3, wherein the data associated with the determined source of funds used to complete the retail purchase is received from a component of a gaming establishment fund management system.

6. The system of claim 1, wherein the data associated with the completion of the retail purchase and the data associated with the determined source of funds used to complete the retail purchase are each received from a component of a gaming establishment fund management system.

7. The system of claim 1, wherein the designated source of funds comprises a gaming establishment retail account.

8. The system of claim 1, wherein the processor comprises a component of a gaming establishment patron management system.

9. A system comprising:

a processor; and a memory device that stores a plurality of instructions that, when executed by the processor, cause the processor to:

responsive to an approved purchase at a point-of-sale terminal associated with a retail establishment, cause a transfer of an amount of funds from a gaming establishment retail account maintained in association with a retail patron to an account associated with the retail establishment, and communicate data associated with the transfer to a component of a gaming establishment patron management system, wherein the communication of data associated with the transfer occurs independent of the point-of-sale terminal associated with the retail establishment and the component of the gaming establishment patron management system determines an incentive to associate with the retail patron in association with the approved purchase at the point-of-sale terminal associated with the retail establishment and causes a display device to display the determined incentive.

10. The system of claim 9, wherein the processor comprises a component of a gaming establishment fund management system.

11. A method of operating a system, the method comprising:

responsive to a receipt of data associated with a completion of a retail purchase, receiving data associated with a determined source of funds used to complete the retail purchase, and responsive to the determined source of funds used to complete the retail purchase being a designated source of funds:

determining, by a processor, a first incentive comprising a base incentive not associated with the designated source of funds and a bonus incentive associated with the designated source of funds, associating, by the processor, the determined first incentive with a retail patron, and displaying, by a display device, the determined first incentive associated with the retail patron.

12. The method of claim 11, further comprising, responsive to the determined source of funds used to complete the retail purchase being a non-designated source of funds, determining, by the processor, a second incentive comprising the base incentive.

13. The method of claim 11, wherein the data associated with the completion of the retail purchase is received from a point-of-sale terminal associated with the completion of the retail purchase.

14. The method of claim 13, wherein the data associated with the determined source of funds used to complete the retail purchase is received from the point-of-sale terminal associated with the completion of the retail purchase.

15. The method of claim 13, wherein the data associated with the determined source of funds used to complete the retail purchase is received from a component of a gaming establishment fund management system.

16. The method of claim 11, wherein the data associated with the completion of the retail purchase and the data associated with the determined source of funds used to complete the retail purchase are received from a component of a gaming establishment fund management system.

17. The method of claim 11, wherein the designated source of funds comprises a gaming establishment retail account.

18. The method of claim 11, wherein the system comprises a gaming establishment patron management system.

* * * * *